US011702036B2

(12) United States Patent
Deak et al.

(10) Patent No.: US 11,702,036 B2
(45) Date of Patent: Jul. 18, 2023

(54) CLOSURE ELEMENT

(71) Applicant: Robert Bosch GmbH, Stuttgart (DE)

(72) Inventors: Peter Deak, Budapest (HU); Akos Hegyi, Mezőhegyes (HU); Juergen Klein, Ettlingen (DE); Tino Boos, Baden-Baden (DE); Ulrich Metz, Achern (DE); Viktor Hackl, Sopron (HU)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 16/632,193

(22) PCT Filed: Jun. 25, 2018

(86) PCT No.: PCT/EP2018/066958
§ 371 (c)(1),
(2) Date: Jan. 17, 2020

(87) PCT Pub. No.: WO2019/015918
PCT Pub. Date: Jan. 24, 2019

(65) Prior Publication Data
US 2020/0164836 A1 May 28, 2020

(30) Foreign Application Priority Data

Jul. 19, 2017 (DE) .................... 10 2017 212 407.5
Aug. 2, 2017 (DE) .................... 10 2017 213 439.9

(51) Int. Cl.
*B60S 1/04* (2006.01)
*F16C 11/06* (2006.01)

(52) U.S. Cl.
CPC ........... *B60S 1/0425* (2013.01); *B60S 1/0447* (2013.01); *F16C 11/069* (2013.01); *F16C 2326/09* (2013.01)

(58) Field of Classification Search
CPC . F16C 11/06; F16C 11/069; F16F 9/54; B60S 1/0447; B60S 1/0425
See application file for complete search history.

(56) References Cited

U.S. PATENT DOCUMENTS 6,145,181 A * 11/2000 Murata ............... F16C 11/0671
403/50
2004/0034957 A1 * 2/2004 Buchanan, Jr. ......... B60S 1/245
15/250.31

(Continued)

FOREIGN PATENT DOCUMENTS

BE        499755     3/1951
CN    1910376 A    2/2007

(Continued)

OTHER PUBLICATIONS

International Search Report for Application No. PCT/EP2018/066958 dated Oct. 12, 2018 (English Translation, 3 pages).

*Primary Examiner* — Daniel J Wiley
(74) *Attorney, Agent, or Firm* — Michael Best & Friedrich LLP (57) ABSTRACT

Closure element having two brackets which are substantially perpendicular or transverse with respect to one another. The closure element closes a ball socket, with the result that a pivot therein cannot be removed. To this end, it closes the opening of the ball socket. The ball socket and the pivot with the closure element form a secured ball joint which is used for wiping systems. The securing is carried out by the closure element being pushed onto the ball joint.

17 Claims, 5 Drawing Sheets

(56) References Cited

U.S. PATENT DOCUMENTS

| | | | | |
|---|---|---|---|---|
| 2004/0253049 A1* | 12/2004 | Bissonnette | ........ | F16C 11/0657 |
| | | | | 403/128 |
| 2013/0042427 A1* | 2/2013 | Zimmer | .................... | B60S 1/24 |
| | | | | 15/250.34 |
| 2018/0201228 A1* | 7/2018 | Shiratori | ................... | B60S 1/28 |

FOREIGN PATENT DOCUMENTS

| | | |
|---|---|---|
| CN | 101196208 A | 6/2008 |
| DE | 19647023 A1 | 5/1998 |
| DE | 10242299 A1 | 3/2004 |
| DE | 102016209861 | 8/2017 |
| FR | 2222893 | 10/1974 |
| FR | 2887836 | 1/2007 |
| JP | 2008240782 A | 10/2008 |
| JP | 2011520700 A | 7/2011 |
| WO | 2005033531 | 4/2005 |
| WO | 2018024539 | 2/2018 |

* cited by examiner

CLOSURE ELEMENT

BACKGROUND OF THE INVENTION

The invention relates to a closure element for a ball joint, to a ball socket of a ball joint, to a ball joint having such a closure element and to a wiper system having such a closure element, and to a method for arranging the closure element on the ball joint.

Ball joints in which a peg with a ball head is arranged in a ball socket are known. The peg with the ball head is not secured in the ball socket, and so an unintended disassembly of the ball socket can easily take place. The peg with the ball head can unintentionally be pulled out from the ball socket. Such disadvantageous ball joints are installed, for example, in wiper systems for motor vehicles.

SUMMARY OF THE INVENTION

The present invention has the advantage that the ball joint is secured by means of a closure element in such manner that unintentional disassembly of the ball joint is not possible.

In order to achieve the advantage of the invention, the closure element is constructed mainly from two mutually transversely arranged brackets. Here, the first bracket is designed for securing the ball joint. The first bracket secures the ball joint when the closure element is arranged in an end position on the ball socket. The second bracket positions the closure element in relation to the ball socket in an intermediate position that the closure element assumes during a mounting process of the ball joint. This intermediate position is particularly advantageous when, for example, a peg provided with a ball head is pushed into the ball socket. The intermediate position can be defined by stops, such that it can correspond to a stop position.

Alternatively, a closure element can be provided according to the invention as claimed in the independent claims, which is initially arranged in an end position on the ball socket. Once the closure element is in its final position, the ball head is pushed by the first bracket and secured thereby. The second bracket ensures the end position of the closure element. As a result, two positioning steps are not needed.

Advantageously, the first bracket is designed in a U-shape. It is substantially U-shaped and comprises two legs with free ends. The U-shaped bracket features a groove-like cross-sectional profile along its principal direction of extension. The groove-like cross-sectional profile is open towards the inside, such that the groove forms a closed U-shaped contour towards the outside, which extends substantially along the direction of extension of the bracket. The groove-shaped bracket thus features two side walls that, starting outwards from the U-shaped external contour, extend radially inwards. As a result of such a shaped bracket, a secure mount for the ball joint is possible.

An advantageous development of the invention provides a particularly firm hold, wherein the first bracket comprises a blocking side and a bracket side, wherein the sides are formed by the side walls. The blocking side in this case features a fastening slot, which is designed as a recess in the side wall assigned to the blocking side. The fastening slot is intended for fixing the closure element on the ball joint. Furthermore, the bracket side features the second bracket. The bracket side is similarly designed with a recess, wherein the recess can receive a part of the ball socket of the ball joint. The recess on the bracket side is generally larger than the recess of the fastening slot.

According to the invention, the advantageous second bracket extends transversely from the bracket side of the first bracket. The second bracket can also extend perpendicularly from the bracket side. In this case, the second bracket is designed in an arcuate shape from one leg to the other leg of the first bracket. The arc can feature rounded portions and/or corners. Furthermore, the arc can comprise straight and curved sections, wherein the second bracket extends from the free end of the first bracket. In this case, the second bracket is integrally formed directly on the free ends.

If the second bracket is U-shaped, a closure element that is easy to mount and is secure is obtained. The second bracket is designed preferably as a strip that has a particular width in the direction of extension of the legs of the first bracket. The particular width of the second bracket can be shorter than the length of the legs of the first bracket, such that the second bracket originates only from a portion of the first bracket. In such a case, an edge of the second bracket can be designed to be flush with the free ends of the legs of the first bracket or the edge can be spaced apart from the free ends. The U-shaped bracket is designed similarly to a band from one leg to the other. The second bracket has no free ends. Alternatively, the second bracket can also cover the entire length of the legs of the first bracket, such that the particular width of the second bracket has the length of the legs.

In order to ensure the best possible mounting of the ball joint, the second bracket is provided with a cutout for a positioning extension. The cutout is formed preferably at the edge of the second bracket in such a manner that it is open towards the outside, such that the positioning extension can be guided into the cutout by a lateral movement along the direction of extension of the legs of the first bracket.

In order that the positioning extension can be advanced into the cutout as easily as possible, it is advantageous if the second bracket is designed in a resiliently elastic manner. In this way, the second bracket can be elastically deflected transversely to the first bracket. The elastic deflection is effected preferably by the positioning extension when it is pushed through under the bracket.

The advantageous positioning extension is arranged on the ball socket. The ball socket is bowl-shaped and has a side that faces the second bracket. This side is dome-shaped. The positioning extension is arranged on the dome. The positioning extension is arranged preferably eccentrically on the dome. The dome can be designed in a round or angular manner. A particularly advantageous embodiment is obtained by using a ramp-shaped positioning extension. The positioning extension has an inclined plane that fulfills a ramp function. The ramp of the positioning extension is aligned in the pushing direction of the closure element. The second bracket is guided along the ramp and, on account of the inclined plane, the second bracket is elastically deflected transversely to the first bracket. The inclined plane makes it possible to elastically deflect the second bracket by way of a pushing movement in the direction of the legs of the first bracket.

On the opposite side of the ball socket, in an expedient development of the invention, at least one extension is integrally formed at the edge of the opening in the ball socket, which formed with the fastening slot. Preferably, two extensions are provided, which are arranged in a line along the diameter in a manner aligned with the pushing direction. The extensions position and fasten the ball socket with respect to the closure element in an end position of the mounting process.

The advantageous mounting process for the ball joint comprises a ball socket, which is injection molded into a joint rod. The ball socket preferably features the positioning extension and two extensions on the opposite side. The closure element is mounted on that end of the joint rod on which the ball socket is injection molded. In the process, the fastening slot is rotated to the side of the extensions, such that the second bracket is on the side of the positioning extension. Now, the closure element is pushed along the joint rod in the direction of the legs of the first bracket and partially over the ball socket, until the free ends of the socket butt against a first extension. The first extension is diametrically opposite to the second extension in relation to the ball socket opening and further away from the end of the joint rod than the second extension. In this position, the positioning extension is engaged in the cutout. During the operation of pushing into this stop position, the positioning extension is brought up to the edge of the second bracket that is aligned in the direction of the free ends. During the pushing operation, the positioning extension is guided under the second bracket, wherein the latter is elastically deflected. When the positioning extension has been guided under the bracket, it enters the cutout and the second bracket relaxes into its initial position. This method enables secure and unambiguous mounting of the closure element.

If the closure element is arranged at the stop at the first extension, a peg with a ball head can be pushed into the opening of the ball socket through the fastening slot. Since the fastening slot reduces the opening of the ball socket and the ball socket of the peg has a larger dimension than the fastening slot, the legs of the first bracket are splayed by the ball head. The splaying of the legs takes place elastically. When the ball head passes through the fastening slot and reaches into the ball socket through the opening in the ball socket, the legs relax into their initial position.

Thereafter the closure element is pushed further, until the second extension comes to rest in a corresponding recess inside the fastening slot. This corresponding recess is designed in a complementary manner in the second extension and formed at an axial end of the fastening slot. A protrusion projecting into the fastening slot comes to rest at the first extension, such that the two extensions are situated between the complementary recess and the protrusion in relation to the pushing direction. In this end position, the closure element is securely mounted.

The first bracket features the two legs with free ends and an arc that is shaped to follow the end of the joint rod. An edge of the joint rod can engage in the groove-like structure of the first bracket. The edge of the joint rod at the end of the joint rod can rest in the groove in the end position.

Alternatively to this two-stage mounting process, the closure element can be brought directly in one step into an end position in which the extensions engage in the slot. At the same time, in the case of the alternatives, the positioning extension is arranged in the cutout in the second bracket in the end position and remains there. For that purpose, the cutout is positioned along the direction of extension of the leg of the first bracket at the height of a transition region between the legs and the arc of the bracket. This can be achieved by the second bracket having a particular bracket width corresponding to the length of the legs of the first bracket. In this way, a robust embodiment is achieved. Alternatively, this position of the cutout can be achieved by forming the cutout in a lug, which reaches up to the transition region of the legs and of the arc, while the width of the second bracket does not occupy the entire length of the legs. This ensures excellent elasticity of the closure element. Once the closure element has been brought directly into the end position, the ball head can be pushed into the ball socket through the slot in the underside. In doing so, the legs splay to the extent that the head can slide into the socket. For this purpose, a chamfer is integrally formed on the underside of the slot.

In all embodiments, a depression that may be intended for a finger can be formed in the top side of the second bracket. The depression is for holding the closure element mounted in the end position in place when inserting the ball head. In so doing, a finger of the assembler can be placed on the depression and the ball head can be fitted.

BRIEF DESCRIPTION OF THE DRAWINGS

The following figures illustrate the embodiment according to the invention, which is encompassed by the claims and described in the following text:

DETAILED DESCRIPTION

Figure 1:
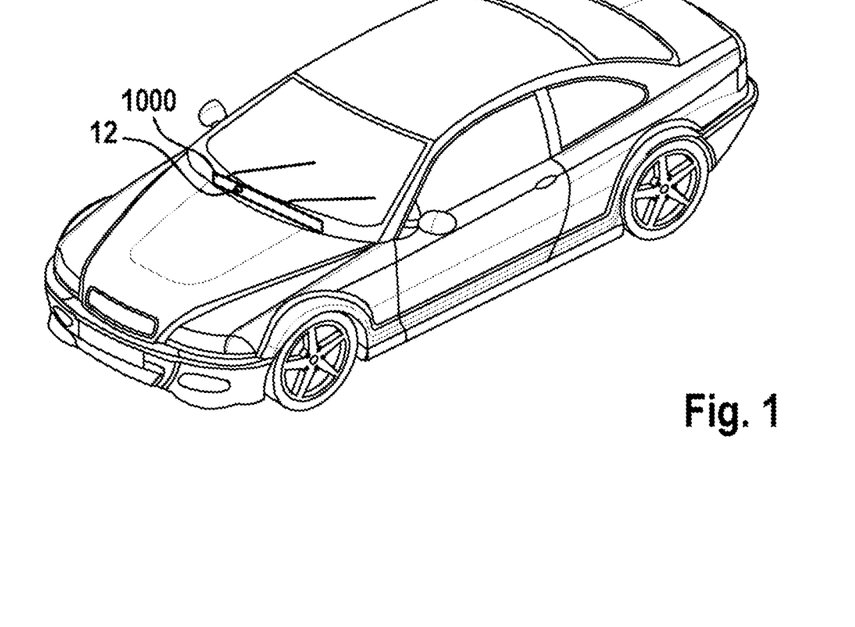
FIG. 1 shows a motor vehicle with a wiper system with a ball joint according to the invention.

FIG. 1 shows a motor vehicle that has a wiper system 1000, which is driven by means of a linkage 1001. The linkage 1001 is connected to a windshield wiper and a motor. This connection is realized by at least one ball joint 12. This ball joint 12 is equipped according to the invention with a closure element 10 as depicted in the figures.

Figure 2:
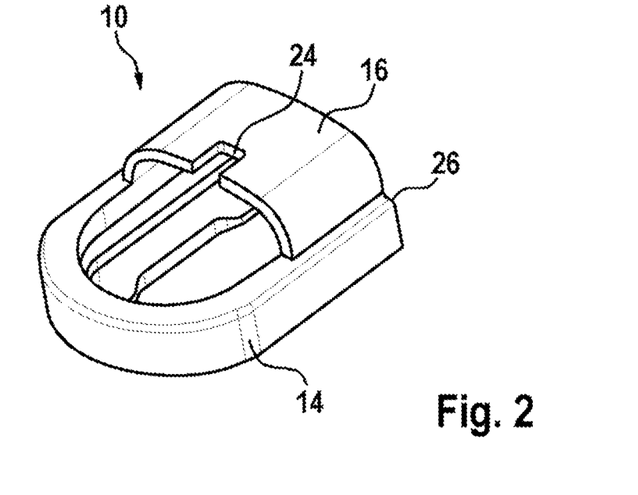
FIG. 2 shows a closure element according to the invention.

Such a closure element 10 is depicted in FIG. 2. The closure element 10 features two brackets 14, 16. The two brackets 14, 16 are arranged transversely, preferably perpendicularly, to each other. The first bracket 14 is U-shaped. Along its main direction of extension, it features a groove-shaped cross-sectional profile. In this case, the groove-shaped cross-sectional profile is opened radially towards the inside and its side walls form recesses.

The first bracket 14 also features free ends 26 which are formed on the legs of the U-shaped first bracket 14. Two legs are present, which extends substantially parallel to each other. The legs are of equal length and transition into a common round section, which is situated opposite to the free ends 26. In the region of the ends 26, the annular cross-sectional profile is open.

Similarly, the recesses in the side walls are open in the direction of the free ends 26. The second bracket 16 is U-shaped and extends from one leg to the other leg on one bracket side 20 of the first bracket 14. The second bracket 16 is designed in the form of a strip. The width of the strip extends in the extension direction of the legs of the first bracket 14. The bracket side 20 is formed by the side walls.

The second bracket 16 has an edge that is oriented in the direction of the free ends 26. This edge is flush form with the free ends 26. On an opposite edge of the second bracket 16, a cutout 24 is formed. This cutout 24 is centrally on the edge of the second bracket, such that this cutout 24 is opened in the direction of the round section of the first bracket 14. The cutout 24 substantially has a rectangular cross section.

Figure 3:
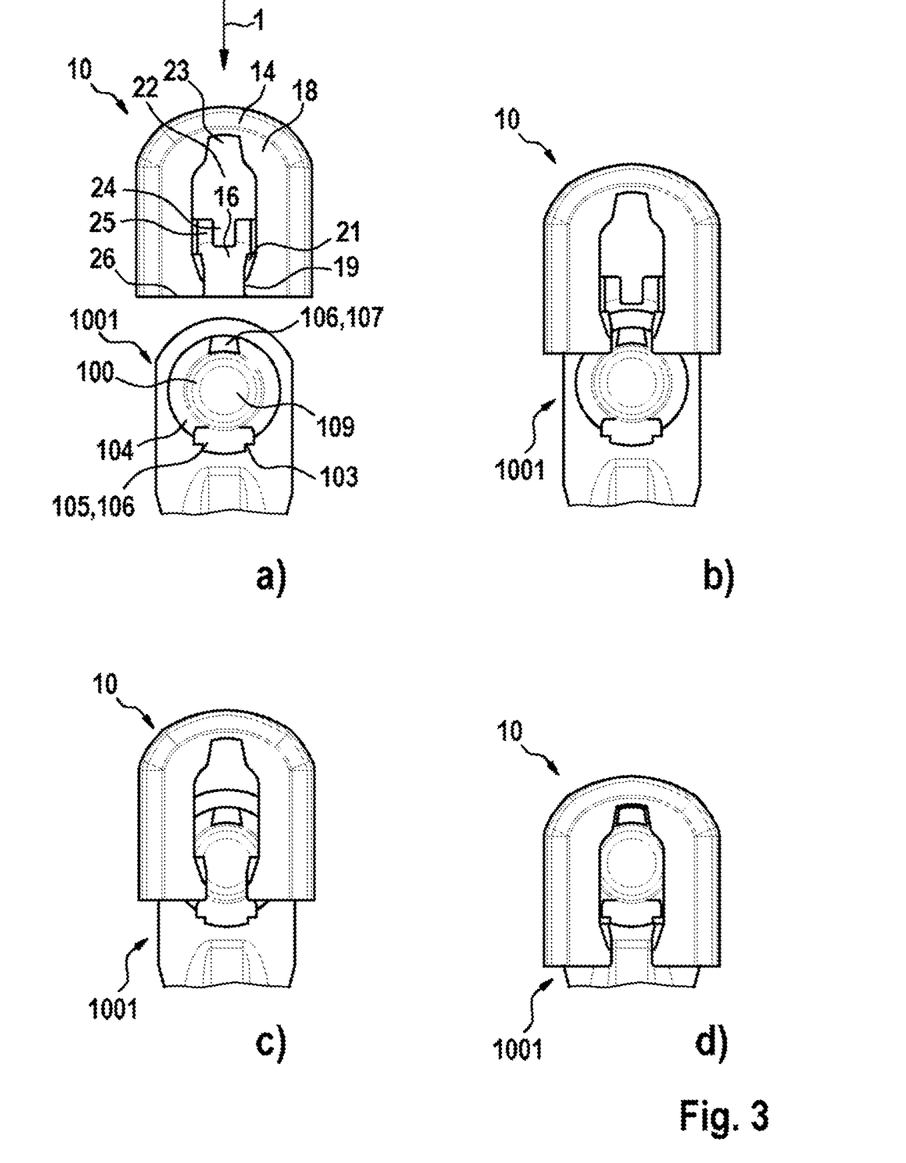
FIG. 3 shows in views a) to d) a mounting sequence of the closure element, viewed from a blocking side of the closure element.

The mounting process of the closure element 10 is depicted in FIG. 3 in four steps a) to d).

In this case, in the region of the edge of a joint rod 1001, a ball socket 100 is molded on. The ball socket 100 is shown with its opening 109. The opening 109 is bordered by a collar, on which two diametrically opposed extensions 106 are arranged. The two extensions 106 align with the mounting direction 1 of the closure element 10. The two extensions 106 extend substantially perpendicularly from the collar in a common direction, which is transverse to the legs of the first bracket 14.

In this direction, a blocking side 18 of the first bracket 14 is formed, which contains a fastening slot 22. The blocking side 18 is provided by the side walls of the groove-shaped cross-sectional profile. The fastening slot 22 features a dimension transverse to the legs which is smaller than the diameter of the opening 109.

Furthermore, the fastening slot 22 extends in the direction of the legs of the first bracket 14. Formed in the fastening slot 22 is a recess 23 which is formed in the axial end of the fastening slot 22 in the region of the round section of the first arc 14. This recess 23 is complementary to a second extension 107 of the two extensions 106, wherein the second extension 107 is closer to the closure element 10 in the mounting direction 1 of the closure element 10 at the beginning of mounting as in FIG. 3 a), than a first extension 105 of the two extensions 106 is. The second extension 107 is closer to the round section of the first bracket 14. The second extension 107 features a trapezoidal cross section in a plane parallel to the opening 109, wherein the complementary recess 23 has a trapezoidal contour. The first extension 105 features a substantially T-shaped cross section. Here, the T-shaped cross section is aligned in the mounting direction 1.

At the opposite end of the fastening slot 22, in the region of the free ends 26, a protrusion 19 is formed on each edge side, assigned to the respective leg, of the fastening slot 22. The protrusion 19 is formed in a stepped manner in the mounting direction 1 along the fastening slot 22. In this case, the step of the protrusion 19 is oriented in the direction of the complementary recess 23. The protrusion 19 extends flush as far as the free end 26. On the outwardly directed side of the blocking side 18, a chamfer 21 is contoured on the protrusion 19. The chamfer 21 has a triangular contour, with its tip coinciding with the step of the protrusion 19. As a result of the chamfer 21, the step narrows towards the inside. The step is complementary to the undercut 103 of the T-shaped cross section of the first extension 105.

During the mounting process, the pushing of the closure element 10 causes the second extension 107 to be conveyed first into the fastening slot 22 as shown in FIG. 3 b). The joint rod 1001 is in the process pushed into the annular cross-sectional profile of the U-shaped first bracket 14.

Figure 4:
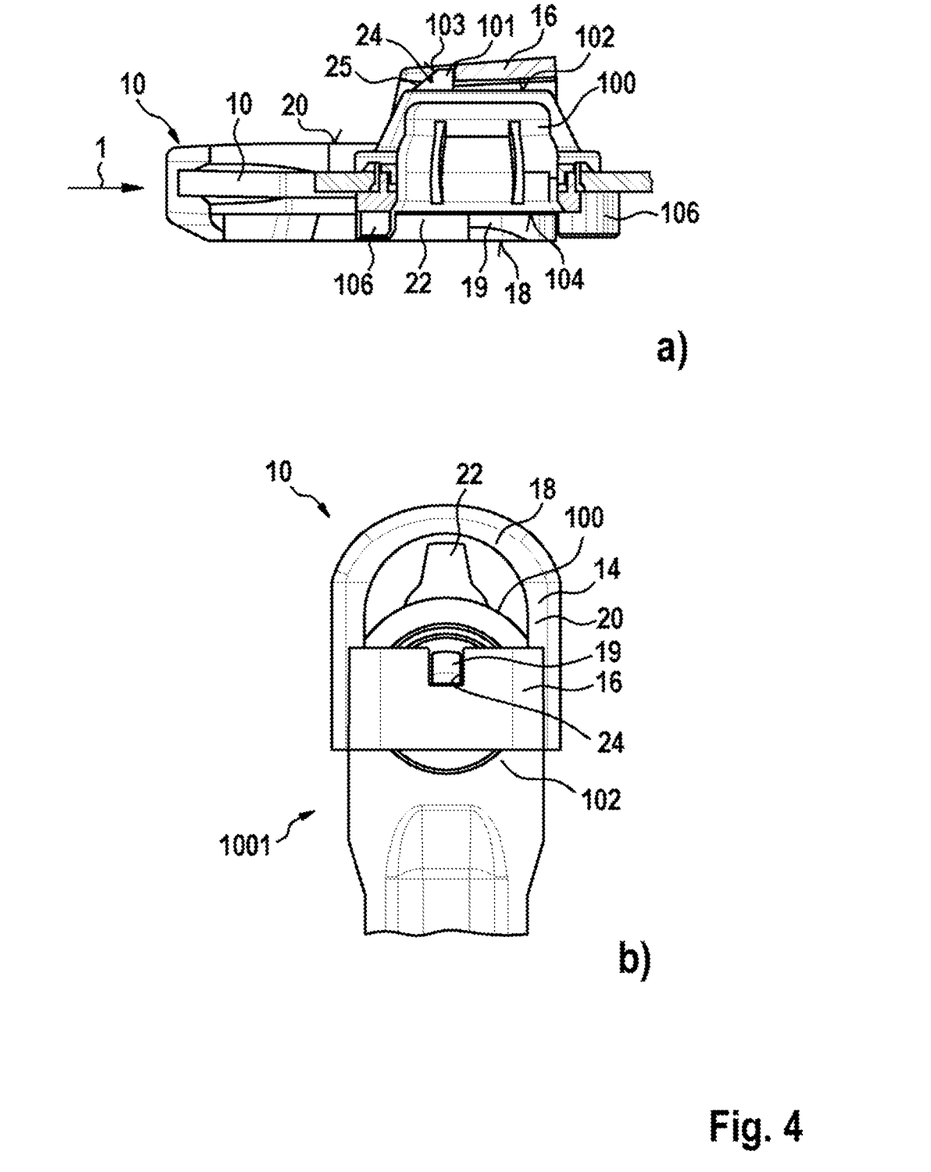
FIG. 4 shows in views a) and b) sectional elevation and plan views of the closure element in a stop position.

The closure element 10 is pushed in the mounting direction 1 until it passes into a stop position as shown in FIG. 3 c). The stop position is also shown in FIG. 4. In the stop position the part of the protrusion 19 facing the free end 26 butts against the first extension 105. In the process, the protrusion 19 bears against on the side of the first extension 105 that faces the opening 109. Here, the second extension 107 is spaced apart from its complementary recesses 23.

In FIG. 3 d), the closure element 10 has been pushed onto the ball socket 100 to such an extent that the second extension 105 has been inserted into the complementary recess 23. At the same time, the steps of the protrusions 19 are fitted to the left and right in the undercut 103 of the T-shaped first extension 105.

In FIG. 4, the stop position is shown first in section according to a) and secondly from a bracket side 20 according to b).

In the stop position, in addition to the protrusion 19 bearing against the first extension 106, the positioning extension 101 is also arranged in the cutout 24. In this case, an axially directed surface, which extends substantially perpendicularly from an underside of a dome of the ball socket 100, also butts against on the contour of the cutout 24.

In order to pass into the stop position, the positioning extension 101 is pushed through under the second arc 16, while the joint rod 1001 is pushed into the groove-shaped cross-sectional profile of the first bracket 14. In order for pushing to be easy, the positioning extension 101 has an inclined plane 103 in the mounting direction 1. The inclined plane 103 causes a ramp-like design of the positioning extension 101. Further, the second bracket 16 is tilted with respect to the mounting direction 1, such that the mounting direction 1 and an imaginary line along at least the region of the underside of the second arc 16 along which the positioning extension 101 is guided enclose an acute angle. In other words, the joint rod 1001 and the underside of the second arc 16 enclose an acute angle which is open in the direction of the joint rod. If the positioning extension 101 is now brought to the edge of the second bracket 16 directed towards the free ends 26 in mounting direction 1, the inclined plane 103 interacts at least with the tilted underside of the second arc 16 in such a manner that it can be easily pushed through under the second arc 16. The second arc 16 is elastic and is additionally deflected upwards by the positioning extension.

Furthermore, the region of the cutout 24 has a chamfer 25 on the edge facing the round section, said chamfer preventing a collision of the underside of the second arc 16 with the dome of the ball socket 100. The chamfer 25 spaces the underside apart from the dome. If this chamfer 25 were not there, the edge of the second arc 16 would rest on the dome on account of the acute angle between the second arc 16 and the joint rod 1001.

Figure 5:
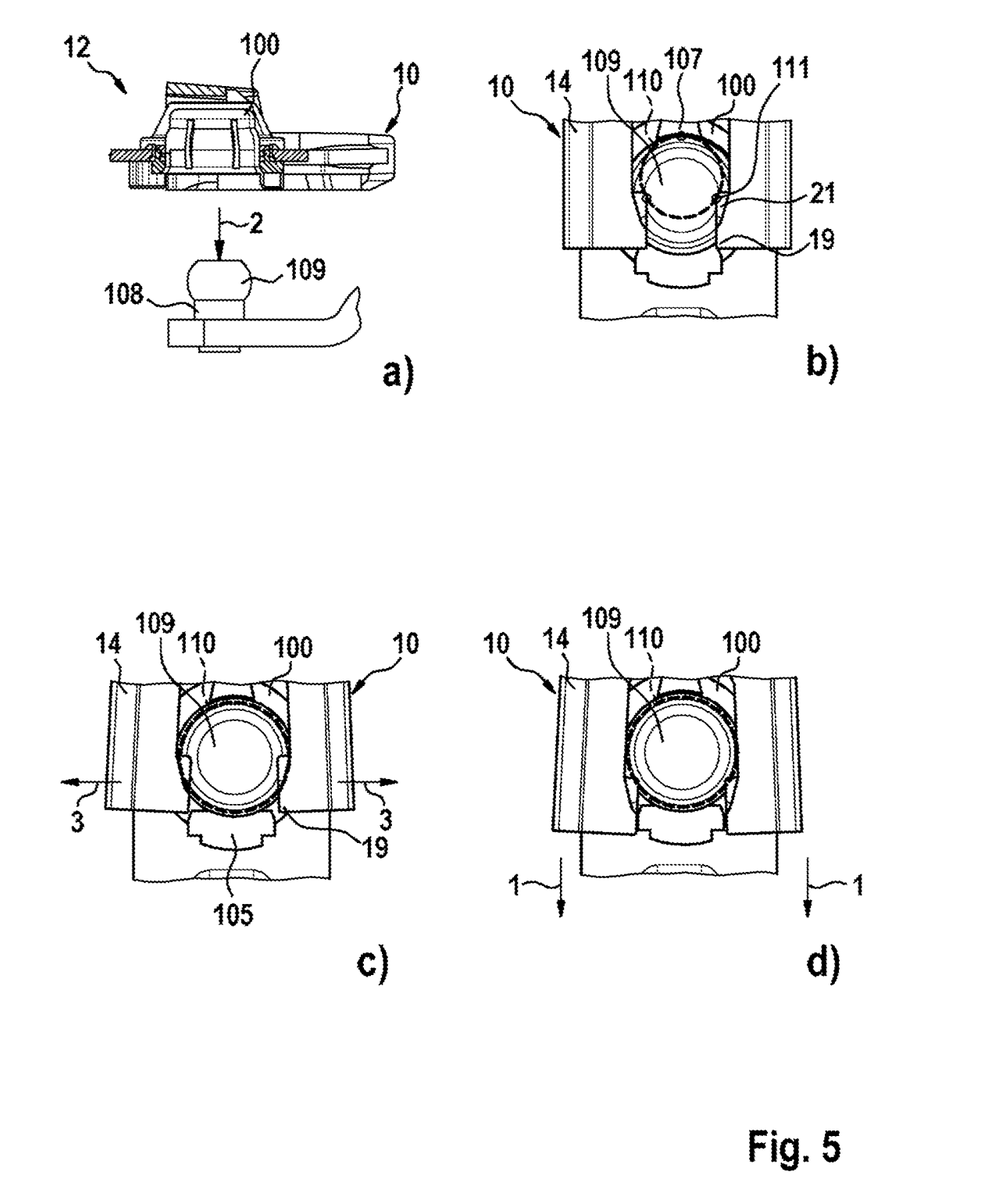
FIG. 5 shows in views a) to d) fitting of a peg with ball head in the stop position.

FIG. 5 shows the mounting of a peg 108 with a ball head 110 in the ball socket 100 of the ball joint 12, wherein the closure element 10 is in the stop position. The contour of the ball head is schematically illustrated by the broken line.

The peg 108 is fitted in the ball socket 100 in a fitting direction 2 as shown in a). In the process, the steps proceed according to b) to d). The ball head 110 has a smaller diameter dimension than the width dimension of the fastening slot 22. Since the opening 109 is now blocked by the edge of the fastening slot 22 and the protrusions 19, a peg 108 to be fitted first rests on three contact points 111, as is shown in b) by three black schematic points. It rests on the chamfers 21 and radially on the second extension 107. The chamfers 21, following their inclined plane, guide the ball head 110 of the peg 108 against the radially directed side of the second extension 108 and towards the inside through the opening 109.

Due to the force of the inclined plane, the legs of the first bracket 14 are splayed in a direction 3 transverse to the legs. This takes place until the protrusions 19 no longer bear against the radially directed side of the first extension 105 but rather are spaced apart further from each other than the extension 105 is wide. The pushing can now continue in the mounting direction 1 of the closure element 10. The pushing is supported or fully effected solely by the inclined plane of the chamfer 19. If the ball head 110 has now completely slid off the chamfers 19, it can slide into the ball socket 100 through the opening 109. Further pushing leads to a relaxation of the legs when the protrusions 19 are positioned behind the second extension 105. In this case, they engage in the undercuts 103 and the opening 109 is narrowed such that the ball head 110 cannot be removed.

Figure 6:
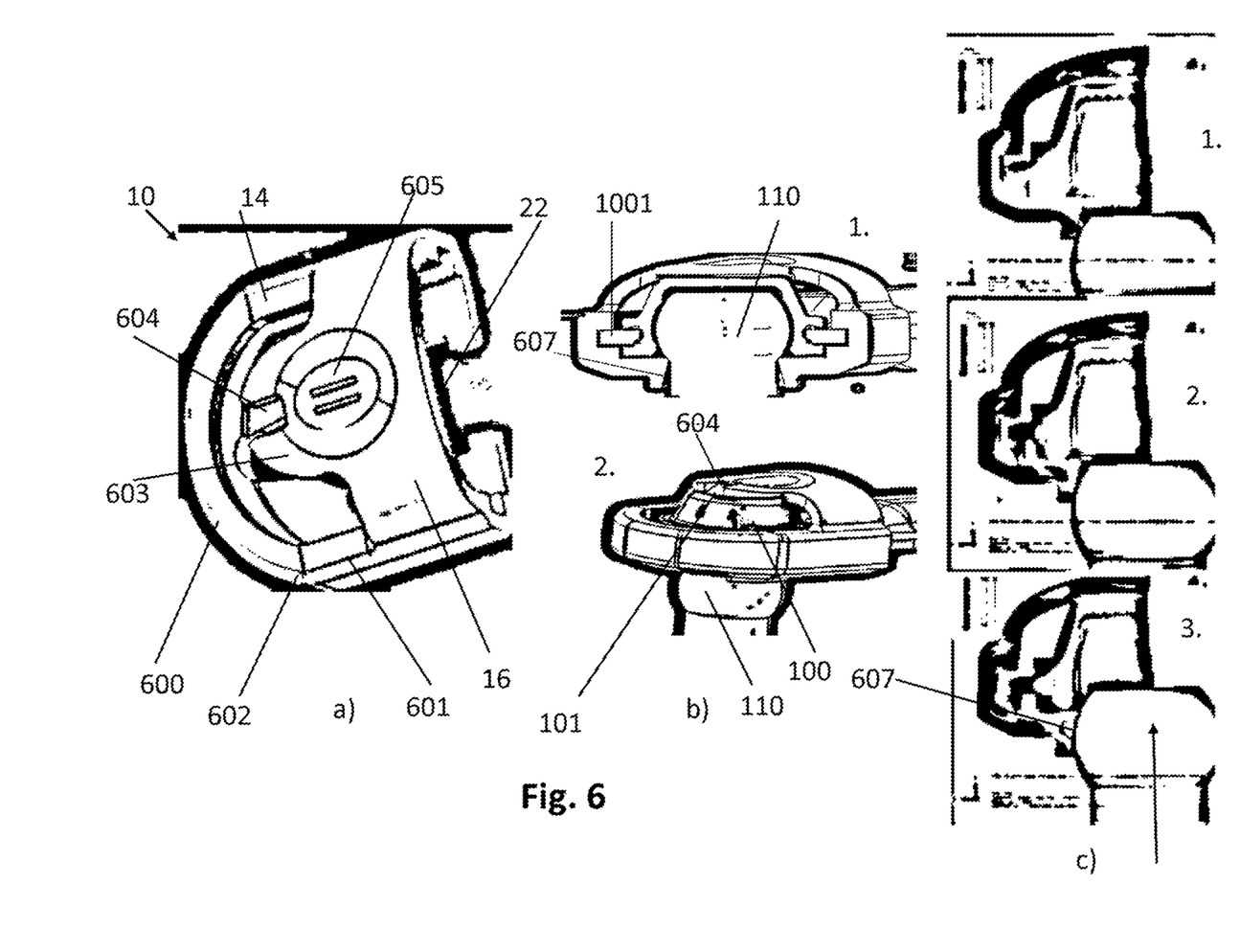
FIG. 6 shows in views a) to c) an alternative closure element that is brought directly into an end position.

An alternative embodiment of the closure element 10 is shown in FIG. 6. In principle, the structure and function of this alternative are the same as the previously described embodiment of the closure element 10. It is therefore possible to combine the features, especially those relating to the fastening slot 22 and/or the mounting of the ball head and/or of the bracket side and/or of the blocking side, of the other embodiment with this alternative. The alternative closure element 10 can be mounted directly in the end position. In FIG. 6 a), the closure element shows two legs 601 with free ends and an arc 600 between the legs 601, wherein the legs and the arc build the first bracket 14. A transition region 601 is arranged between a leg and the arc, in which the arc transitions into the leg. This can also be the case in the previous embodiment. The second bracket 16 features a depression 605 for a finger of an assembler. The assembler can press on the depression 605 and generate a counterforce for the mounting of the ball head 110. Furthermore, a lug 603 is integrally formed centrally on the second bracket, said lug projecting from an edge of the bracket 16 that faces the arc 600. The lug has a semi-circular contour in which the cutout 604 for the positioning extension 101 is formed. The cutout is formed at the distal end of the lug and in the direction of extension of the legs 601 at the height of the transition region 602. When the closure element 10 is mounted in the end position, as shown in FIG. 6 b), the positioning extension 101 is arranged in cutout 604 and the lug 604 covers the ball socket 100. The ball head 110 is arranged in the ball socket after mounting, which can be seen in FIG. 6 b), wherein the ball head 110 has been fitted via slopes 607 that are arranged in the contour of the fastening slot 22. The edge of the joint rod 1001 sits in the groove-like structure of the first bracket 14. In this case, the bracket 14 borders the end of the joint rod 1001 with its legs and the arc. This can also be the case for the previously described embodiments. The mounting of the closure element shown in FIG. 6 similarly takes place by pushing on in the longitudinal direction of the joint rod, as takes place in the previous embodiments. Similarly, the legs are splayed and the extensions can be encompassed at the ball socket. FIG. 6 c) shows how a ball head is fitted in the ball socket 100 in the direction of the arrow. The ball head 110 is pushed into the ball socket 100 through the fastening slot 22, wherein the legs 601 splay. In the process, the ball head 110 is placed against the fastening slot 22, as shown in FIG. 6 c) 1. An assembler can now press his finger on the depression 601 and generate a counterforce for mounting in the direction of the arrow. By means of the slope 607, the ball head begins to slide into the ball socket and, at the same time, to splay the legs 601, which is shown in FIG. 6 c) 2. The splaying reaches a maximum value when the slopes are arranged approximately at the location of the largest diameter of the ball head in the direction of the arrow, which is shown in FIG. 6 c) 3. When the location of the largest diameter has passed through the region of the fastening slot 22, the legs relax back into their original state and block the opening in the ball socket to the ball head and prevent easy removal of the ball head.

All embodiments can also be mounted without extensions on the underside of the ball socket. A ball socket can be provided that has only one positioning extension. Alternatively, the positioning extension can be left out, but the extensions or at least one of the extensions could be provided.

The invention claimed is:

1. A closure element (10) for securing a ball joint (12), wherein the closure element (10) comprises mutually transversely arranged first and second brackets (14, 16), wherein the first bracket (14) is configured for securing the ball joint (12) and the second bracket (16) is configured for positioning the closure element (10) during mounting of the ball joint (12), wherein the first bracket (14) has a blocking side (18) and a bracket side (20), wherein the blocking side (18) includes a fastening slot (22) for fixing the closure element (10) and the bracket side (20) includes the second bracket (16), wherein the fastening slot (22) is a through-opening extending through the blocking side (18).

2. The closure element (10) as claimed in claim 1, characterized in that the first bracket (14) has a U-shape and has a groove-like cross-sectional profile along a principal direction of extension.

3. The closure element (10) as claimed in claim 1, characterized in that the second bracket (16) extends transversely from the bracket side (20).

4. The closure element (10) as claimed in claim 1, characterized in that the second bracket (16) has a U-shape.

5. The closure element (10) as claimed in claim 1, characterized in that the second bracket (16) includes a cutout (24, 604) for a positioning extension (101).

6. The closure element (10) as claimed in claim 1, characterized in that the second bracket (16) is resiliently elastic.

7. A ball joint (12) comprising a ball socket (100) and the closure element (10) as claimed in claim 1, wherein a peg (108) is arranged in the ball socket (100) and the closure element (10) closes an opening (109) in the ball socket (100) with the fastening slot (22) such that the peg (108) is guided into the ball socket (100) through the fastening slot (22).

8. The ball joint (12) as claimed in claim 7, wherein the second bracket (16) includes a cutout (24, 604) for a positioning extension (101), and wherein the positioning extension (101) engages in the cutout (24).

9. A wiper system (1000) having a linkage (1001) comprising at least one ball joint (12) with the closure element (10) as claimed in claim 1.

10. A method for mounting a closure element (10) on a ball joint (12) as claimed in claim 1, characterized in that the closure element (10) is pushed onto the ball joint (12) and the first bracket (14) is thereby splayed in a resiliently elastic manner.

11. The method as claimed in claim 10, wherein the second bracket (16) includes a cutout (24, 604) for a positioning extension (101), and wherein the second bracket (16) is deflected in a resilient elastic manner by the positioning extension (101) when it is guided through under the second bracket (16) during the pushing operation, until it engages in the cutout (24, 604).

12. The closure element (10) as claimed in claim 1, characterized in that the second bracket (16) extends perpendicularly from the bracket side (20), wherein the second bracket is mounted directly at the free ends (26) of the first bracket (14).

13. The closure element (10) as claimed in claim 1, characterized in that the second bracket (16) has a U-shape and includes a strip and a lug (603).

14. The closure element (10) as claimed in claim 13, characterized in that the second bracket (16) includes a cutout (24, 604) for a positioning extension (101), wherein the cutout (604) is formed in the lug (603).

15. A ball socket (100) for forming a ball joint (12) that is secured by the closure element (10) as claimed in claim 1, wherein the second bracket (16) includes a cutout (24, 604) for a positioning extension (101), and wherein the ball socket (100) includes the positioning extension (101) eccentrically on a side (102) facing the second bracket (16).

16. A ball socket (100) for forming a ball joint (12), wherein the ball socket (100) is configured to be secured to the closure element (10) as claimed in claim 1, wherein the second bracket (16) of the closure element (10) includes a cutout (24, 604) for a positioning extension (101), and wherein the ball socket (100) includes the positioning extension (101) on a first side (102) configured to face the second bracket (16), wherein the first bracket (14) of the closure element (10) includes the blocking side (18) and the bracket side (20), wherein the blocking side (18) includes the fastening slot (22) for fixing the closure element (10) and the bracket side (20) includes the second bracket (16), and wherein the ball socket (100) includes extensions (106) configured to interact with the fastening slot (22), wherein the extensions (106) are formed on a second, opposite side of the ball socket (100), and are separate from and spaced from the positioning extension (101), and are configured to face the blocking side (18) of the closure element (10).

17. The ball socket (100) as claimed in claim 16, characterized in that the positioning extension (101) is ramp-shaped.

\* \* \* \* \*